United States Patent [19]
McCoy

[11] Patent Number: 4,467,356
[45] Date of Patent: Aug. 21, 1984

[54] TRANSMITTING TWO TELEVISION SIGNALS THROUGH ONE CHANNEL

[76] Inventor: Reginald F. H. McCoy, 1354 NE. 31st Pl., Gainesville, Fla. 32601

[21] Appl. No.: 305,049

[22] Filed: Sep. 24, 1981

[51] Int. Cl.³ .............................................. H04N 7/08
[52] U.S. Cl. .................................. 358/146; 358/142; 358/135; 358/12
[58] Field of Search .............. 358/146, 142, 147, 133, 358/134, 135, 136, 137, 138, 131, 12

[56] References Cited

U.S. PATENT DOCUMENTS

| | | | |
|---|---|---|---|
| 2,975,234 | 3/1961 | Blan | 358/142 |
| 4,004,084 | 1/1977 | Brown | 358/146 |
| 4,027,333 | 5/1977 | Kaiser | 358/146 |
| 4,210,927 | 7/1980 | Yumde | 358/133 |
| 4,215,370 | 7/1980 | Kirk | 358/146 |

Primary Examiner—Tommy P. Chin

[57] ABSTRACT

Two input pictures are each compressed horizontally, one to three-quarters width, the other to one-quarter width, and combined side-by-side to form a single picture suitable for transmission over a standard link. The two signals are interchanged on alternate fields. Bandwidth limiting in the transmission link results in the signal compressed to one-quarter width having a final bandwidth one-third that of the other signal. This applies to each picture on alternate fields. A one-field delay repeats the high-frequencies from the field having wider bandwidth on the subsequent field, so that fine detail will be present on both fields. Lower bandwidth information is separately transmitted every field preserving vertical detail and the reproduction of motion at field rate. At the receiving end, the pictures are separated and expanded to normal width.

4 Claims, 2 Drawing Figures

TRANSMITTING TWO TELEVISION SIGNALS THROUGH ONE CHANNEL

BACKGROUND OF THE INVENTION

With the limited spectrum space available for television communications links the occasion frequently arises when it would be desirable to transmit two television signals over a channel initially designed to carry only a single such signal. In the case of microwave or satellite links, or cable or other point-to-point links such a capability would double the transmission capacity of the channel without additional cost of transmission channel equipment as well as avoiding the need for additional frequency allocations in the case of radio links.

Where the signals are not intended for direct reception by the general public it is not necessary that the transmitted signal conform to broadcasting standards, provided that, if it is intended for subsequent broadcasting, it can be converted to broadcast standards after transmission over the link.

If the available channel bandwidth is split in two in order to convey two signals, each signal will have only half the total bandwidth. If this total bandwidth was initially intended for a single signal, each of the two television signals will suffer severe loss of resolution due to the halving of the bandwidth for each channel. Similar problems arise when attempts are made to time-share two signals on one channel on an element-by-element, line-by-line, or field-by-field basis. Resolution in the two signals, and/or the capability for portraying motion, is degraded.

SUMMARY OF THE INVENTION

This invention seeks to transmit two television signals over a single channel, while maintaining acceptable resolution in each, and without degrading the reproduction of motion in the resulting television images. It is applicable to color television signals as well as monochrome. The combined signal transmitted over the channel retains the standard synchronizing and blanking waveforms, and standard color subcarrier frequency, so that it may be passed by the equipment used in a standard television link without modification.

By compressing the width of each television image before transmission over the link such that the sum of the widths of the two images is equal to the width of a single standard image, and then combining the two images side-by-side, the combined image may be treated as a single image and transmitted using standard equipment. Subsequently the two images may be separated, and each expanded horizontally to normal width, again rendering them suitable for broadcasting and display on standard receivers and monitors.

However, in compressing an image horizontally, the frequency spectrum of the signal is scaled upward by the reciprocal of the factor by which the image has been compressed. Expansion of the image reverses this process, scaling the frequency spectrum downward. If the compressed signals are passed through a channel of limited bandwidth then on expansion each signal will have a bandwidth lower than the bandwidth of the channel.

For example, if each image is compressed to half the normal width, and the combined signal is passed through a channel of 5.5 MHz bandwidth, after expansion each signal will have a bandwidth of only 2.75 MHz. This would normally be inadequate for the reproduction of high-quality television images.

It is not necessary to compress the two images equally. If one is compressed to one-quarter normal width and the other to three-quarters normal width they may be combined and transmitted as a single standard image. After separation and expansion to normal width the first image would have a bandwidth of $\frac{1}{4}$ the channel bandwidth, (that is 1.375 MHz in the above example of 5.5 MHz channel), and the second image would have a bandwidth of $\frac{3}{4}$ of the channel bandwidth, (4.125 MHz in the above example). While the first image would have unacceptably low resolution, the second image would be fully adequate for television broadcasting. The channel bandwidths of television links normally exceed the bandwidth necessary for broadcasting so that the figures in the above example are representative of typical conditions.

According to this invention, the two input television images are compressed by different factors, the sum of the two factors being unity. The two factors are then interchanged between the two images on alternate television fields.

The result of this process will be that each image, after expansion to normal width, will have fields which alternately have narrow and wide bandwidths. Using the figures of the above example in each image the bandwidth would alternate between 1.375 MHz and 4.125 MHz. However any channel adequate to pass a standard color television signal may be used, also different compression factors may be used. The bandwidths obtaining on each field will then be given by the product of the channel bandwidth and the compression factor for that field.

It is well known that a high degree of correlation exists between the adjacent lines of a television image, particularly in the higher frequency range. This fact is exploited in comb filters used to separate high-frequency luminance signals from the chrominance signals of a composite color signal. Essentially this comb filter process, now widely used, results in the high-frequency information in the filtered signal being averaged between adjacent television lines. This has been found to result in negligble degradation of normal television images. The correlation that exists between adjacent lines of a single field will also apply as between a line in one field and an adjacent line in the interlaced field in the absence of motion.

For the purposes of this invention the existence of this correlation may be exploited by repeating the higher-frequency content of the lines in the field having wide bandwidth in the adjacent lines of the next field, which have narrow bandwidths. Thus, in the above example, on the lines occurring in one field, having 4.125 MHz bandwidth the band between 1.375 and 4.125 MHz would be delayed by one field and added to the signal of the adjacent lines of the next field, initially having only 1.375 MHz bandwidth, to provide detail extending to 4.125 MHz on these lines also.

The result is an image having horizontal resolution corresponding to 4.125 MHz on all lines, and, since the lower frequencies are transmitted independently for each field, the full vertical resolution. Such an image will appear to be a full-resolution image with no loss of sharpness in either horizontal or vertical directions.

This process is applicable to both the images transmitted by the above method, thus providing a system in which two full-resolution images may be transmitted through a single channel.

Since the higher frequencies of each individual image are only transmitted on alternate fields, in areas of the image containing motion there will be a reduction in the repetition rate at which moving fine detail is portrayed. However it is well known that the resolving capability of the human eye for objects in motion is lower than that for static objects. Additionally lag in the television camera tubes tends to cause a reduction of resolution of moving objects, (which is normally acceptable), which results in the amplitude of the higher frequencies which are repeated on the interlaced field being reduced, thereby further reducing the visual affect of the fine detail information being updated on alternate fields only.

The method of alternating between two different compression values may also be applied on an alternate line basis instead of on alternate fields. However subsequent separation of luminance and chrominance of the transmitted image is then more difficult since the normal correlation between adjacent lines is no longer present. For this reason the preferred approach is to change between the two compression values on alternate fields.

DESCRIPTION OF THE DRAWINGS

The invention, both as to its organization and method of operation, together with further objects and advantages thereof, will best be understood with the aid of the following specification and attached drawings wherein.

DETAILED DESCRIPTION OF THE PREFERRED EMBODIMENT

Figure 1:
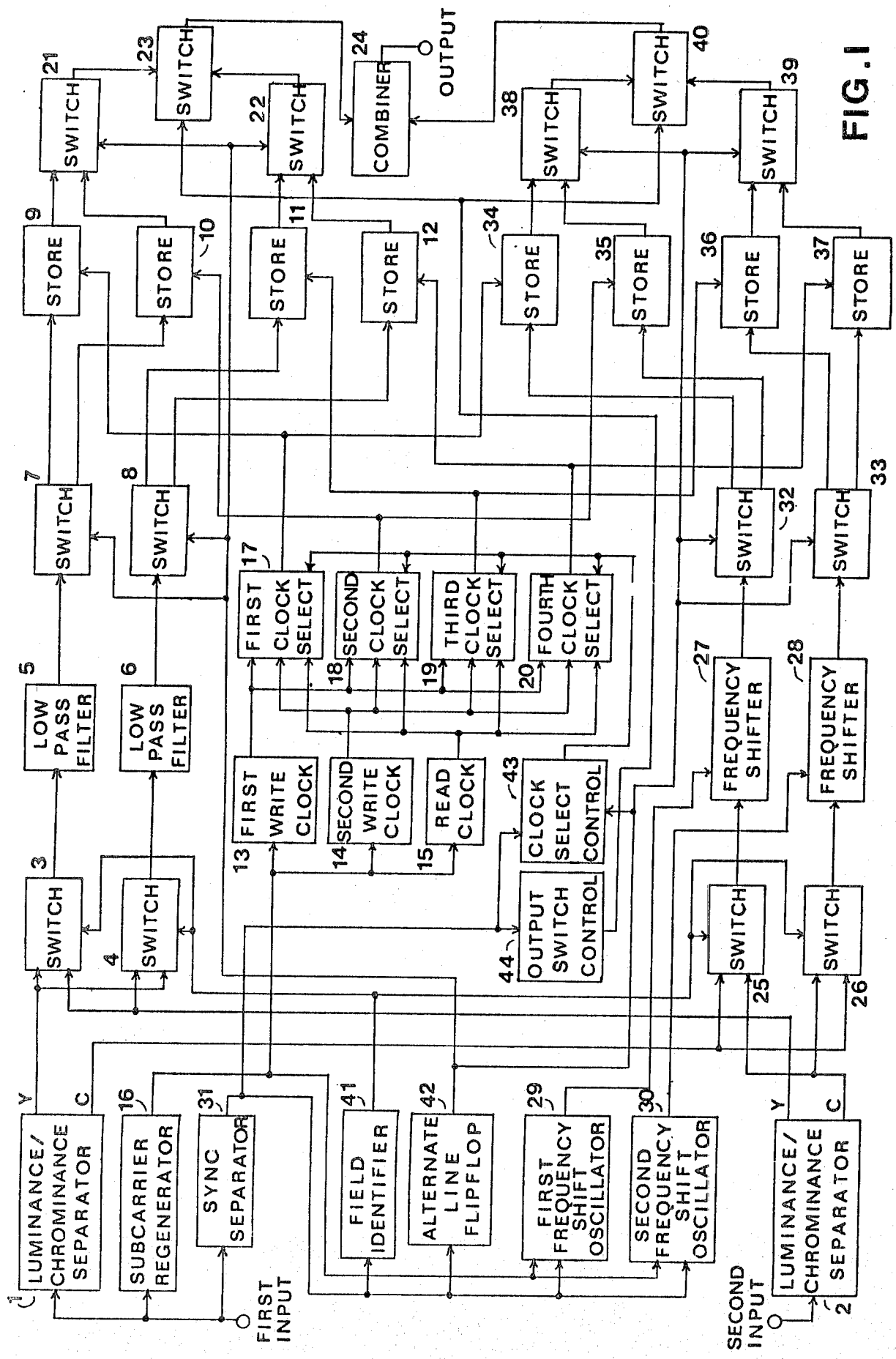
FIG. 1 shows a general block diagram of one method of combining two television signals by the methods of this invention.

One method of implementation of the system of this invention for combining two television signals is illustrated in FIG. 1. It is to be understood that other methods of achieving the same result will occur to those skilled in the art and the use of this invention is not restricted to the specific embodiment here described.

The two video input signals are first applied to separators 1 and 2 to separate the luminance and chrominance signals. While simple low-pass and band-pass filters may be used for this purpose, the use of comb filters, which are a known art and not part of this invention, is to be preferred. Such comb filters permit the high frequency luminance components, which are interleaved with the chrominance components in the frequency spectrum of the composite signal, to be separated.

The luminance outputs of the two separators 1 and 2 are passed to switches 3 and 4 which route them on alternate fields to low-pass filters 5 and 6. These limit the bandwidth of the signals to less than half the rate at which they are subsequently to be sampled when written into the one-line stores, to avoid generation of spurious aliasing frequencies. The two signals then pass to switches 7 and 8 which route them on alternate lines to stores 9, 10 and 11, 12 respectively. Stores 9 and 10 should be capable of storing the signal which is to occupy the greater part of the width of the combined image, and stores 11 and 12 should be capable of storing the signal which is to occupy the lesser part of this width. Any known storage method may be used for this purpose. Integrated circuit type CCD 321A manufactured by Fairchild Camera and Instrument Corporation is suitable for this function. This device is an analog shift register in which successive samples of the input signal are stored in analog form, and may subsequently be read out in the same sequence as they were written into the device. The rate at which the data samples are written into the shift register, and subsequently read out is controlled by clock pulses supplied to the device. Consequently by using a different frequency of the clock pulses for writing the samples into the register from that used for reading, the output signal can be compressed or expanded in time, that is the samples will emerge at a different rate to that which they had when written into the register.

Two write clock oscillators, 13 and 14, and a read clock oscillator 15 are provided. It is preferable, but not essential, that the frequencies of these oscillators should be related to the color subcarrier frequency of the video signals. Accordingly a subcarrier regenerator 16 is provided, which locks to the burst of one of the input signals, shown here as the first input. It is necessary for operation of the system that the two signals should be synchronous, so the burst and synchronizing pulses from either signal may be employed to synchronize the oscillators and control functions of the system. It is alternatively possible to lock the oscillators 13, 14, and 15 to multiples of the horizontal frequency of the video signals.

For example, the storage device previously mentioned, type CCD 321A, comprises two sections each of which stores 455 samples of an analog video signal. In the NTSC color system there are 227½ cycles of the subcarrier frequency in one horizontal line period. Consequently if the read clock oscillator frequency is six times the subcarrier frequency, or alternatively 1365 times the horizontal frequency, all the samples previously stored in both sections of one of these devices will be read out in two-thirds of the horizontal line period. If stores 9 and 10 are composed of both sections of the CCD 321A device, and stores 11 and 12 are composed of one section only, it is then possible to read, at six times subcarrier frequency, from store 9 followed by store 11, or from store 10 followed by store 12, in one horizontal line period.

Also for example, if one of the input images is to be compressed in width to three-quarters of its normal width then the write clock frequency for this signal should be three-quarters the read clock frequency, which in this case is 4.5 times the subcarrier frequency or 1023¾ times the horizontal frequency. If the other image is to be compressed to one-quarter its normal width the write clock frequency should be one-quarter the read clock frequency, which in this case is 1.5 times the subcarrier frequency or 341¼ times the horizontal frequency. In practice it is desirable that the phase of the write clocks should be the same for each line, that is the oscillators should be reset at the start of each line to avoid the phase difference which would otherwise result from the fraction of a cycle which occurs in the two numbers quoted above.

For the example quoted therefore read clock oscillator 15 is locked to six times subcarrier frequency (for the NTSC system), first write clock oscillator 13 is locked to 4.5 times subcarrier frequency and second write clock oscillator 14 is locked to 1.5 times the subcarrier frequency. The phase of the last two is reset at the start of each line. Suitable clock frequencies for use with different compression factors or with different storage devices will be apparent to those skilled in the art.

Selection of which of the three clock oscillators is to be fed to store 9 is performed by first clock select switch 17. Similarly selections of the clock for stores 10, 11, and 12 are made by second, third and fourth clock select switches 18, 19 and 20 respectively.

The pairs of stores 9, 10 and 11, 12 are alternately operated so as to write the input signals into the store and to read the stored samples out. Switches 7 and 8 route the inputs to the stores being written and switches 21 and 22 select the output from the stores being read.

It is desirable that the synchronizing pulses, blanking interval and color burst should not be compressed, but passed unchanged. Since the input signals are synchronous, the blanking interval may be taken from either.

In order that this part of the signal should not be compressed the store into which it is being written should be fed with clock pulses from the read clock oscillator 15 during this time.

The switching between write and read modes for the stores is performed at a point during the horizontal blanking interval the precise timing of which is discussed subsequently. Also at this time, switches 7 and 8 will be set to route the input signals to stores 9 and 11 respectively. Switches 21 and 22 will also be set to select the outputs read from stores 10 and 12.

Second and fourth clock select switches 18 and 20 are set to supply the read clock to stores 10 and 12, in sequence, so that the data previously stored in these two stores will be completely read out in one horizontal line period.

Initially first clock select switch 17 is set to supply the read clock to store 9 causing the input signals to be sampled and stored at the same rate as they will subsequently be read out, so that they will not be compressed. This condition is maintained for a count of 61 clock pulses. At a frequency of 6 times subcarrier this occupies a period of 2.84 microseconds. The end of this period is chosen to correspond to the end of horizontal blanking, that is the start of the active picture period. During the time that the read clock is being supplied to store 9, third clock select 19 supplies no clock pulses to store 11.

The conditions of first clock select 17 and third clock select 19 are then changed so that store 9 is supplied from first write clock oscillator 13, at 4.5 times subcarrier frequency, and store 11 is supplied from second write clock oscillator 14 at 1.5 times subcarrier frequency.

The pulses from first write clock oscillator 13 are supplied to store 9 for a count of 849 pulses. Since the total capacity of store 9 (which consists of both sections of the previously mentioned storage device) is 910 samples, and 61 pulses had previously been supplied from the read clock oscillator, the store is now filled. At this point first clock select 17 ceases to supply pulses to store 9.

At 4.5 times subcarrier frequency the count of 849 will occupy 52.7 microseconds, corresponding to the active picture period of the video input to store 9.

Simultaneously store 11 is being supplied with clock pulses from second write clock 14 for a count of 283 pulses, also (at 1.5 times subcarrier frequency) occupying 52.7 microseconds. At this time third clock select 19 routes the read clock, at 6 times subcarrier frequency, to store 11 for a count of 172 pulses. This occurs at the end of the active picture period, that is the start of horizontal blanking. Since store 11 has a capacity of 455 samples, it will now be filled. The time occupied by the count of 172 pulses at 6 times subcarrier frequency is 8.01 microseconds.

Consequently the first part of horizontal blanking will be stored in store 11, for a period of 8.01 microseconds, while the second part of horizontal blanking, having a period of 2.84 microseconds had already been stored in store 9. The total blanking width stored at a clock rate of 6 times subcarrier frequency, which is equal to the read clock, and which therefore will not be compressed, is thus 10.85 microseconds. The active picture period, stored in both of the stores (one receiving the first video signal and the other receiving the second video signal) is 52.7 microseconds, so that the total picture and blanking time is 63.55 microseconds, equal to the duration of one line.

At the end of the count of 172 pulses to store 11, that is at 8.01 microseconds after the start of horizontal blanking, switches 7, 8, 21, 22 and 23 change state. The next line is written into stores 10 and 12, with second clock select 18 and fourth clock select 20 repeating the same sequence as previously described for first clock select 17 and third clock select 19 respectively.

At this time first clock select 17 supplies the read clock to store 9 for a count of 910 pulses, causing all the data in the store to be read out. This data is selected by switch 21 and switch 23 and fed to combiner 24. At the end of this period, third clock select 19 supplies the read clock to store 11 for a count of 455 pulses, causing all the data in this store to be read out. At this time switch 23 changes state so as to pass the data from store 11, by way of switch 22 to combiner 24.

The preceding description has related to the processing of the luminance components of the two signals. The chrominance components may be similarly processed to compress the widths of the images. However compression will result in shifting the subcarrier frequency. It is desirable that the output subcarrier should have the standard frequency in order to facilitate transmission through standard television equipment.

Accordingly the chrominance outputs of separators 1 and 2 are routed through switches 25 and 26 which change state on alternate fields, corresponding to the action of switches 3 and 4 on the luminance signals. The chrominance signals (which are in the form of a standard modulated subcarrier) from switches 3 and 4 are passed to frequency shifters 27 and 28 respectively. These shift the subcarrier frequency by heterodyning, preserving the amplitude and phase modulations of the input.

Using the compression factors of three-quarters and one-quarter as applied to the luminance signals (which factors are used for example; the methods of this invention not being restricted to these specific values), frequency shifter 27 should change the subcarrier frequency to three-quarters of its standard value, and frequency shifter 28 should change the subcarrier to one-quarter of its standard value. This may be achieved by heterodyning the input to frequency shifter 27 with the output of first frequency shift oscillator 29 which is arranged to have a frequency of one-quarter of subcarrier frequency. Frequency shifter 27 may take the form of a balanced modulator, with input and output bandpass filters to reject unwanted frequencies. Similarly the input to frequency shifter 28 is heterodyned with the output of second frequency shift oscillator 30 which is arranged to have a frequency of three-quarters of subcarrier frequency.

It is desirable that frequency shift oscillators 29 and 30 should be reset to a constant phase at the start of each line. The phase relation of the subcarrier to the horizontal sync is thereby preserved. Accordingly a feed of sync from sync separator 31 is provided to these oscillators to reset their initial phases. A feed of subcarrier from subcarrier regenerator 16 is also supplied to these oscillators to lock them to the desired fraction of subcarrier frequency.

Following frequency shifting the two chrominance signals are processed in identical fashion to the two luminance signals. Switch 32 corresponds to switch 7 directing the signal to store 34 or store 35 on alternate lines, and similarly switch 33, corresponding to switch 8 directs its input to store 36 or store 37. Stores 34, 35, 36 and 37 correspond with stores 9, 10, 11 and 12 respectively and are fed the same clock pulses as these corresponding stores.

Switches 38 and 39 correspond to switches 21 and 22 to select the outputs from the stores being read, and switch 40 corresponds to switch 23 to select between the three-quarters compressed signal and the one-quarter compressed signal.

The output of switch 40, which is a chrominance signal with standard subcarrier frequency, is fed to combiner 24 where it is added to the luminance signal from switch 23 to produce a standard composite color signal suitable for transmission.

It will be understood from the preceding description that one of the inputs will be compressed to three-quarters of its normal width and the other input to one-quarter of its normal width. The two input signals are interchanged at field rate by the action of switches 3, 4, 25 and 26 which are controlled by field identifier 41 which detects the odd and even fields from the information contained in the sync pulses from sync separator 31.

The output from alternate line flipflop 42, together with the sync pulses from sync separator 31 also controls clock select control 43 which controls clock selects 17, 18, 19 and 20 to output the clock pulses in the sequence previously described. Output switch control 44 is also locked by sync pulses from sync separator 31 so that it will select between the three-quarter compressed and one-quarter compressed signals at the correct time.

The output of this system is a signal in which on odd fields the first input occupies three-quarters and the second input one-quarter of the total image width, and on even fields the second input occupies three-quarters and the first input one-quarter of this width. When subsequently restored to normal width after passage through a band-limited channel on the odd fields the first signal will have high resolution and the second signal low resolution, on the even fields the converse applies.

Sync and burst are not compressed, and are taken from one or other of the inputs which must be synchronous, with a switch between them during horizontal blanking. Sync is obtained by way of the luminance path and burst by way of the chrominance path so that no undesired phase difference between burst and chrominance can occur, as would have been possible had a separate path been used for burst.

Figure 2:
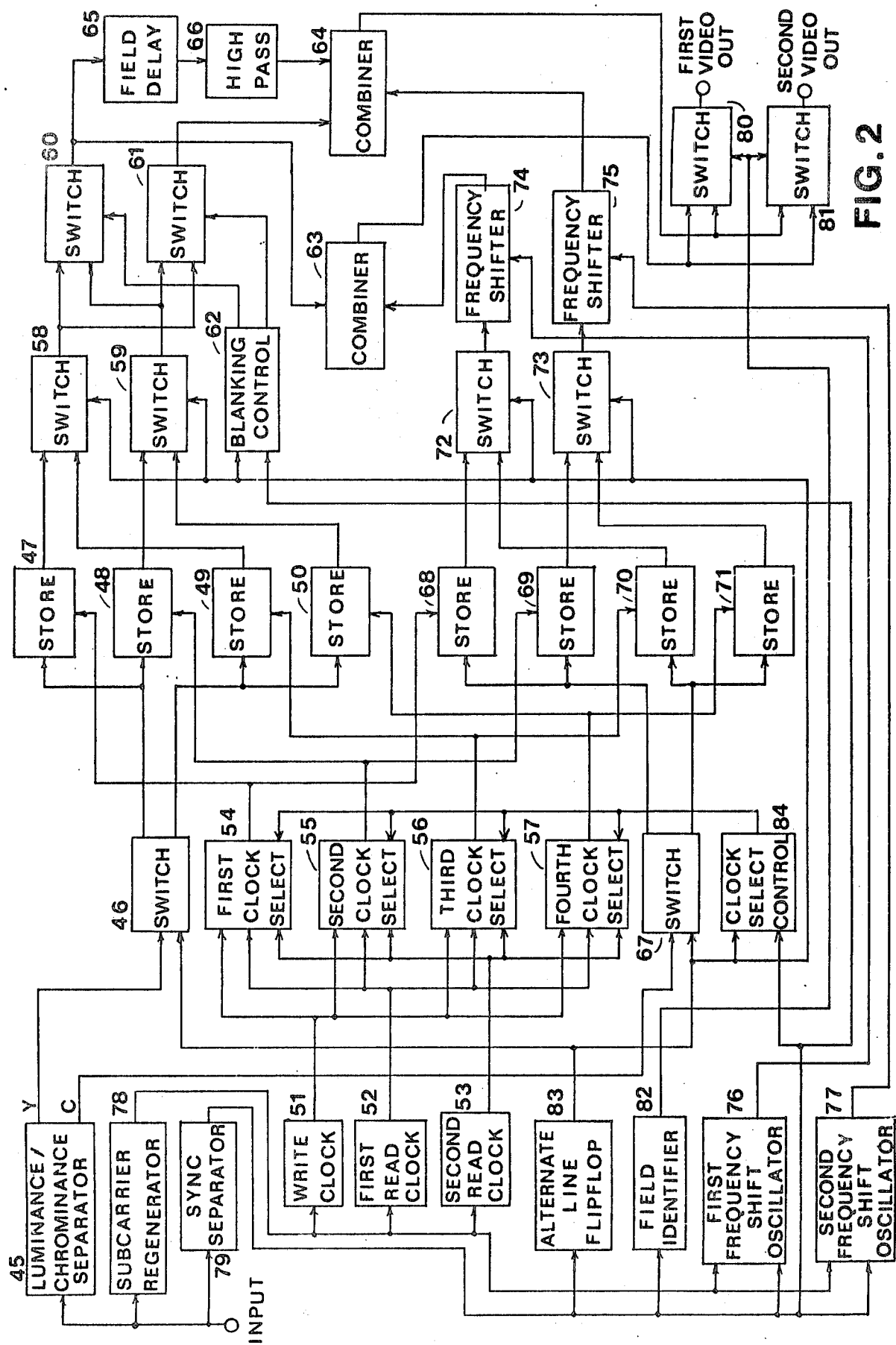
FIG. 2 shows a general block diagram of one method of separation of two television signals which have been combined by the methods of this invention.

At the receiving end the combined signal must be separated into two images and their widths restored to normal. In FIG. 2 is shown one method by means of which this may be achieved. Other methods of performing these functions will be apparent to those skilled in the art and the operation of this invention should not be understood as being limited to the use of the embodiment now to be described.

The action of the circuits illustrated in FIG. 2 is basically the converse of that of the circuits of FIG. 1. In FIG. 2 the combined input signal is supplied to luminance and chrominance separator 45, which is also preferably a type employing comb filters to separate the luminance and chrominance.

The luminance passes to switch 46 which changes state on alternate lines, supplying the signal to either stores 47 and 48 or stores 49 and 50. Stores 47 and 49 have a capacity of 910 samples, while stores 48 and 50 have half this capacity, 455 samples.

Write clock oscillator 51 has a frequency of 6 times NTSC subcarrier frequency or 1365 cycles per line. First read clock oscillator 52 has a frequency of 4.5 times subcarrier frequency, that is 1023¾ cycles per line, and second read clock oscillator 53 has a frequency of 1.5 times subcarrier frequency, or 341¼ cycles per line. The two read clocks are reset each line to delete the fraction of a cycle.

On those lines on which the signal is to be written into stores 47 and 48, at a time 2.84 microseconds before the start of the active picture period, first clock select 54 supplies the write clock, at 6 times subcarrier frequency to store 47. After a count of 910 clock pulses this feed is interrupted and second clock select 55 supplies the write clock to store 48, for a count of 455 pulses. The total time of writing into stores 47 and 48 is thus one line, and store 47 will contain the last 2.84 microseconds of the horizontal blanking interval and the whole of the three-quarter width image, while store 48 will contain the whole of the one-quarter width image plus the first 8.01 microseconds of the horizontal blanking interval.

Switch 46 then changes state and the next line is written into stores 49 and 50 with the clock pulses selected by third clock select 56 and fourth clock select 57 in the same sequence.

Simultaneously first clock select 54 supplies the write clock to store 47 for a count of 61 pulses, thus reading out the 2.84 microseconds of horizontal blanking without expansion. First clock select 54 then supplies the first read clock to store 47 for a count of 849 pulses. Thus the total count is 910 pulses and all samples are read out of the store. The time during which the first read clock, at 4.5 times subcarrier frequency, is fed to store 47 is 52.7 microseconds consequently the stored samples representing the first image are spread out to occupy the full active picture period. After reading out all the samples, the clock pulses to store 47 are interrupted, until the commencement of writing in the signal from the next line.

At the same time that pulses from the first read clock are fed to store 47, pulses from the second read clock are fed, by way of second clock select 55, to store 48. This continues for a count of 283 pulses, thus reading out the second signal which is also spread out to occupy the full active picture period of 52.7 microseconds. Second clock select 55 then supplies the write clock to store 48 for 172 pulses, thus reading out the remaining samples in the store, which comprise the first part of horizontal blanking, without compression.

This sequence is then repeated on the next line to read out the two signals from stores 49 and 50, with the clock pulses being selected by third clock select 56 and fourth clock select 57.

The signals from the store, either 47 or 49, from which the signal that had been compressed to three-quarters normal size is being read are selected by switch 58, and simultaneously the signals from the store either 48 or 50 from which the signal that had been compressed to one-quarter normal size is being read, are selected by switch 59. These signals contain the full active picture period for each signal, but only parts of the horizontal blanking interval. The first 8.01 microseconds of the horizontal blanking interval appears at the output of switch 59, and the last 2.84 microseconds at the output of switch 58.

In order that both signals should contain the full horizontal blanking interval, switch 60 selects the output of switch 59 for the first 8.01 microseconds of blanking, and otherwise selects the output of switch 58, while switch 61 selects the output of switch 58 for the last 2.84 microseconds of blanking, and otherwise selects the output of switch 59. The action of switches 60 and 61 is controlled by blanking control 62.

The outputs of switches 60 and 61 are fed to combiners 63 and 64.

As previously explained the signal which was compressed to one-quarter normal width for transmission, which is the signal which appears at the output of switch 61, will have low resolution due to the effect of passage through a band-limited transmission channel. Accordingly the signal from switch 60 is delayed by one field in field delay 65, and then passed through high-pass filter 66 and added to the signal from switch 61 in combiner 64. Since the two original video inputs alternate between the three-quarter and one-quarter compressed images at field rate, the high frequency components appearing at the output of filter 66 will be those corresponding to the previous field of the signal which is currently passing through the one-quarter compressed path, the lower frequency components of which are appearing at the output of switch 61. High frequency detail from the previous field is thus reinserted into the signal which had been subjected to compression to one-quarter width.

Field delay 65 may comprise any known form of field store into which a video signal may be written and from which it can be read out one field later without any modification such as expansion or compression. Since only the high frequency components of the output signal are used, it may be possible, in a digital implementation of such a field store, to use a lesser number of bits to represent each sample then would normally be employed for a full bandwidth video signal. It should also be noted that the field store is not required to handle the chrominance components of the signal.

The chrominance component of the input signal appearing at the output of separator 45 is initially processed in identical fashion to the luminance component, by way of switch 67 (corresponding to switch 46) and stores 68, 69, 70, 71 (corresponding to stores 47, 48, 49, 50 respectively).

The outputs being read from the stores are then selected by switches 72 and 73, which correspond to switches 58 and 59.

The output of switch 72 is the chrominance from the signal which had been compressed to three-quarters normal width. When expanded to full width the frequency of the subcarrier will be reduced to three-quarters of its normal frequency. It is therefore passed to frequency shifter 74 in which the signal is heterodyned with a frequency of one-quarter of subcarrier frequency and the sum component of the heterodyning process selected by a bandpass filter, thus restoring the signal to normal subcarrier frequency.

Similarly the output of switch 73 will have the subcarrier reduced to one-quarter of normal frequency. It is passed to frequency shifter 75 in which it is heterodyned with a frequency of three-quarters of subcarrier frequency to restore it to normal frequency.

First frequency shift oscillator 76 provides the one-quarter subcarrier frequency signal and second frequency shift oscillator 77 provides the three-quarter subcarrier frequency signal. Both are locked to the subcarrier from subcarrier regenerator 78 and reset at the start of each line by sync pulses from sync separator 79.

The outputs of frequency shifters 74 and 75 are fed to combiners 63 and 64 respectively where they are added with the corresponding luminance signals.

The outputs of combiners 63 and 64 are the signals which have been subjected to three-quarters and one-quarter compression respectively.

As previously explained the two video inputs are alternated between these two paths on alternate fields.

Accordingly switches 80 and 81 are controlled so that on odd fields switch 80 selects the output of combiner 63, and switch 81 that of combiner 64, and on even fields these selections are interchanged.

The output of switch 80 thus corresponds to the first video input signal before transmission and the output of switch 81 corresponds to the orignal second video input signal.

Switches 80 and 81 are controlled by the output of field identifier 82.

Alternate line flipflop 83 changes state on alternate horizontal sync pulses and provides the control for switches 46, 58, 59, 67, 72, 73. It also, together with the horizontal sync pulses provides the inputs for clock select control 84 which controls the sequencing of clock selects 54, 55, 56 and 57 as previously described.

While the preceding description has referred to specific compression factors and to the NTSC color system, it is to be understood that the methods of this invention may be operated with other compression factors and color systems.

While there have been illustrated and described various embodiments of the present invention it will be apparent that various changes and modifications thereof will occur to those skilled in the art. It is intended in the appended claims to cover all such changes and modifications as fall within the true spirit and scope of the present invention.

What is claimed and desired to be secured by Letters Patent of the United States is:

1. Apparatus for the transmission of two independent television signals through a transmission system designed for the transmission of a single television signal, comprising:

a. first compression means for compressing the width of a first independent television image to produce an image of a first width being less than the width of the image supplied as input to said first compression means and greater than one-half of the width of said image supplied as input to said first compression means, b. second compression means for compressing the width of a second independent television image to produce an image of a second width being less than half of the width of the image supplied as input to said second compression means, the sum of said first width and said second width being within the maximum width of image capable of being transmitted by said transmission system designed for the transmission of a single television image, c. combining means for combining said image of a first width and said image of a second width to form a combined image, said combining means including means for horizontally positioning said image of a first width and separate means for horizontally positioning said image of a second width to be separated from, and horizontally adjacent to, said image of a first width, d. means for separating said image of a first width and said image of a second width from said combined image, e. first expansion means for expanding the width of said image of a first width to produce a first expanded image of normal width, and f. second expansion means for expanding the width of said image of a second width to produce a second expanded image of normal width.

2. Apparatus as recited in claim 1 including switching means for alternately switching two television signals between the inputs of said first compression means and said second compression means and between the inputs of said first expansion means and said second expansion means, comprising:

a. first switching means having a first condition of supplying a first television signal to said first compression means together with supplying a second television signal to said second compression means, and having a second condition of supplying said first television signal to said second compression means together with supplying said second television signal to said first compression means, said first switching means alternating between said first condition and said second condition at a predetermined rate, and being in said first condition and said second condition for equal times, b. second switching means having a first condition of supplying the signal representing said first expanded image to a first output together with supplying the signal representing said second expanded image to a second output and having a second condition of supplying said signal representing said first expanded image to said second output together with supplying said signal representing said second expanded image to said first output, said second switching means alternating between said first condition and said second condition at a rate equal to the rate of alternation of said first switching means, and being in said first condition and said second condition for equal times, and c. means for synchronization of the alternations of said second switching means with the alternations of said first switching means, whereby said first television signal always appears at said first output and said second television signal always appears at said second output, each signal alternately being passed through said first compression means and said first expansion means, and through said second compression means and said second expansion means.

3. Apparatus as recited in claim 2 including frequency-separating means for separating those frequency components of each television signal which are present when said signal passes through said first compression means and said first expansion means but which are excluded when said signal passes through said second compression means and said second expansion means and means for repeating said frequency components, separately for each television signal, when said signal passes through said second compression means and second expansion means, comprising:

a. means for delaying the output of said first expansion means by a time delay equal to one-half the period of a complete cycle of alternation of said first switching means and said second switching means, being equal to the time duration of said first condition and to that of said second condition of said first switching means and said second switching means, to produce a delayed version of the output of said first expansion means, b. means for separating said frequency components from said delayed version of the output of said first expansion means, to produce a high-frequency signal, and c. means for adding said high-frequency signal to said signal representing said second expanded image prior to said second switching means, whereby the high-frequency components of said first television signal having passed through said first compression and first expansion means, are delayed and added to said first television signal, following said second expansion means, at the times of passage of said first television signal through said second compression and second expansion means, and likewise the high-frequency components of said second television signal having passed through said first compression and first expansion means are delayed and added to said second television signal, following said second expansion means, at the times of passage of said second television signal through said second compression and second expansion means.

4. Apparatus as recited in claim 2 having the duration of said first condition and of said second condition of said first switching means and of said second switching means separately equal to the time interval in said first television signal corresponding to the height of said first independent television image, said time interval being known as one field period, and being equal to the time interval in said second television signal corresponding to the height of said second independent television image, whereby each of said first television signal and said second television signal passes through said first compression means and said first expansion means for one field period and through said second compression means and said second expansion means for the succeeding field period.

* * * * *